Jan. 4, 1955                F. M. RUSHFELDT                2,698,506
ADJUSTABLY DISPOSED POTATO PICKUP AND CONVEYER THEREFOR
Filed June 4, 1951                                  4 Sheets-Sheet 1
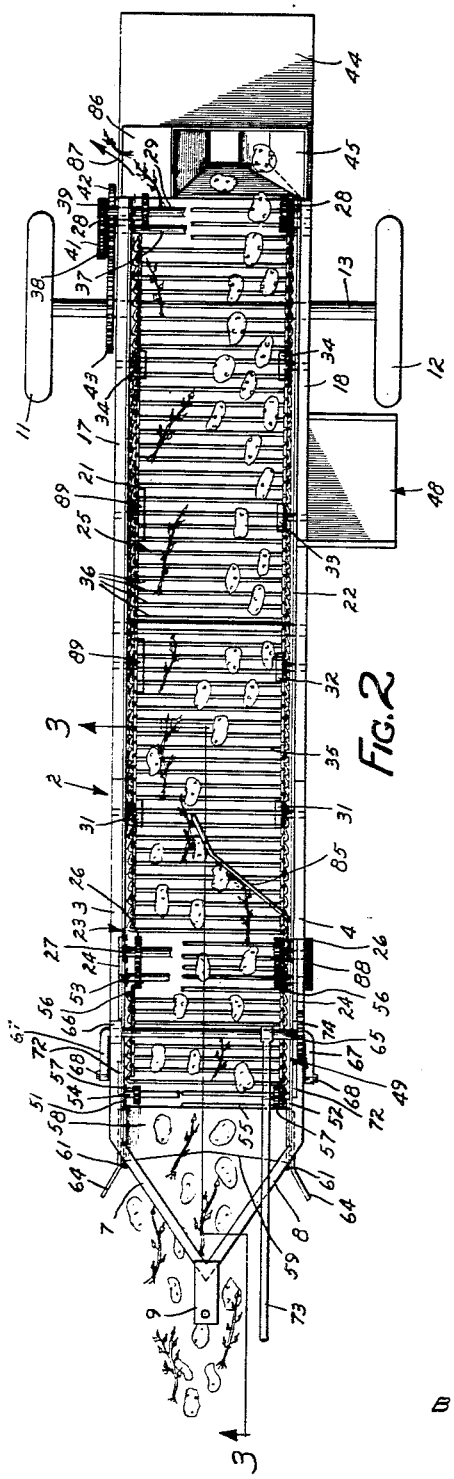
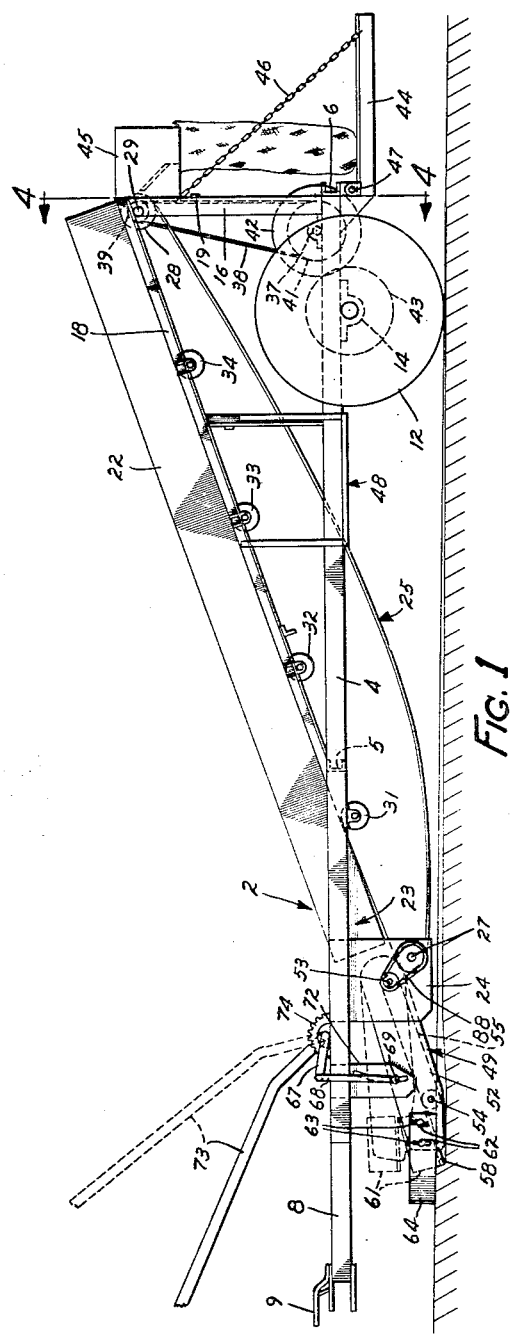
INVENTOR.
FERDIE M. RUSHFELDT, DECEASED,
BY VIVIAN D. RUSHFELDT, ADMINISTRATRIX
BY
ATTORNEYS Jan. 4, 1955     F. M. RUSHFELDT     2,698,506
ADJUSTABLY DISPOSED POTATO PICKUP AND CONVEYER THEREFOR Filed June 4, 1951     4 Sheets-Sheet 3

INVENTOR.
FERDIE M. RUSHFELDT, DECEASED
BY VIVIAN D. RUSHFELDT, ADMINISTRATRIX
BY Paul, Paul & Moore
ATTORNEYS Jan. 4, 1955 F. M. RUSHFELDT 2,698,506
ADJUSTABLY DISPOSED POTATO PICKUP AND CONVEYER THEREFOR
Filed June 4, 1951 4 Sheets-Sheet 4

INVENTOR.
FERDIE M. RUSHFELDT, DECEASED,
BY VIVIAN D. RUSHFELDT, ADMINISTRATRIX
BY
Paul, Paul & Moore
ATTORNEYS

United States Patent Office 2,698,506
Patented Jan. 4, 1955

2,698,506

ADJUSTABLY DISPOSED POTATO PICKUP AND CONVEYER THEREFOR

Ferdie M. Rushfeldt, deceased, late of Minneapolis, Minn., by Vivian D. Rushfeldt, administratrix, Minneapolis, Minn., assignor of one-fourth to Haldur J. Johnson, Minneapolis, one-fourth to Merle A. Rocheleau, Minneapolis, and one-fourth to Roland M. Granger, St. Paul, Minn.

Application June 4, 1951, Serial No. 229,692

1 Claim. (Cl. 55—9)

This invention relates to new and useful improvements in potato pickers and more particularly to a machine for picking up and sacking potatoes or other vegetables after they have been dug, or otherwise removed from the ground.

An important object of the present invention is to provide a potato picker comprising a main conveyor provided at its forward end with a relatively shorter conveyor section having a forwardly extending blade adapted to engage beneath the surface of the soil and pick up and direct the dug potatoes, or the like, onto the shorter conveyor section which, in turn, conveys the potatoes rearwardly and delivers them onto the receiving end of the main conveyor.

A further object of the invention is to provide a potato picker comprising a main conveyor having an open carrying surface whereby foreign matter delivered thereonto with the potatoes may pass through the openings in said conveyor and discharge onto the ground, means being provided at the rear end of the main conveyor for receiving the potatoes and delivering them into a suitable receiving means such as a sack or bag.

A further object is to provide an improved potato picker comprising a main conveyor provided at its forward end with a pick-up section adapted to pick the potatoes from the ground and deliver them onto said main conveyor, and said pick-up section being mounted for relative pivotal movement in a vertical plane, whereby it may be positioned to pick up a minimum of dirt and foreign matter, it being undersood that the dug potatoes are usually disposed on top of the ground whereby they may readily be picked up by the potato picker.

A further object of the invention resides in the means provided over the main conveyor for deflecting the potatoes and vines to one side of its carrying surface, to separate the vines from the potatoes and to facilitate sacking the potatoes.

A further object is to provide a potato picker comprising a main supporting frame provided at its rear end with suitable carrying wheels and having means at its forward end for coupling the machine to a tractor or other propelling vehicle, and an inclined main conveyor being mounted on said frame and provided at its forward end with means for picking up dug potatoes from the ground and delivering them onto the receiving end of said main conveyor, said main conveyor having its effective conveying surface tilted towards one side, whereby the potatoes conveyed thereon may gravitate to one side of its conveying surface, thereby to separate them from the vines and other refuse entrained with the potatoes, and an operator's platform being provided at the rear end of the machine having a hopper adjacent thereto adapted to receive thereon potatoes from the main conveyor, said hopper having means thereon for attaching the open end of a sack or bag thereto.

A further object is to provide an improved potato picker and cleaner which is highly efficient and practical in operation, and which effects a very thorough and complete picking of the potatoes from the surface of the ground, whereby the loss of potatoes is reduced to a minimum.

Other objects of the invention reside in the unique mounting of the pick-up conveyor section at the forward end of the main conveyor, whereby it is readily adjustable from the tractor to properly position it with respect to the ground surface, and whereby the amount of dirt picked up with the potatoes may be reduced to a minimum; in the deflecting means provided over the main conveyor for laterally directing the potato vines to one side of the main conveyor to separate them from the potatoes; in the transverse tilting of the main conveyor whereby the potatoes conveyed upwardly thereon will roll or gravitate to the low side of the carrying surface of said conveyor, thereby to separate them from the potato vines and other refuse carried upwardly on the main conveyor; in the provision of an operator's platform at one side of the main conveyor upon which an operator may be stationed for the purpose of discharging the potato vines from the main conveyor and also removing from the mass of potatoes on the main conveyor, any foreign objects, such as stones, and the like, which are too large to pass through the openings in the conveyor bed; in the provision of means for imparting a vibratory or agitating action to at least a portion of the main conveyor, thereby to remove from the potatoes dirt and other foreign matter which may adhere thereto; in the provision of means whereby the potato picker may readily be converted to an apparatus for picking up relatively smaller garden vegetables such as onions, beets, carrots and the like; and in the simple and inexpensive construction of the entire apparatus whereby it readily lends itself for manufacture in quantity production at extremely low cost, whereby it may be sold to the trade at a moderate price, a highly desirable attribute in apparatus of this general type.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claim which follows.

In the drawings:

Figure 1 is a side elevational view of the potato picker showing the pick-up conveyor section at the front end of the main conveyor in operating position;

Figure 2 is a plan view of Figure 1;

Figure 6 is a view similar to Figure 3, but showing the machine adapted for harvesting small garden products such as onions, carrots, beets, and the like;

Figure 7 is an outside view of the front end of a machine of the type illustrated in Figure 6; and Figure 8 is a top view of the pick-up conveyor section shown in Figure 6, removed from the machine.

Supporting frame

Figure 3:
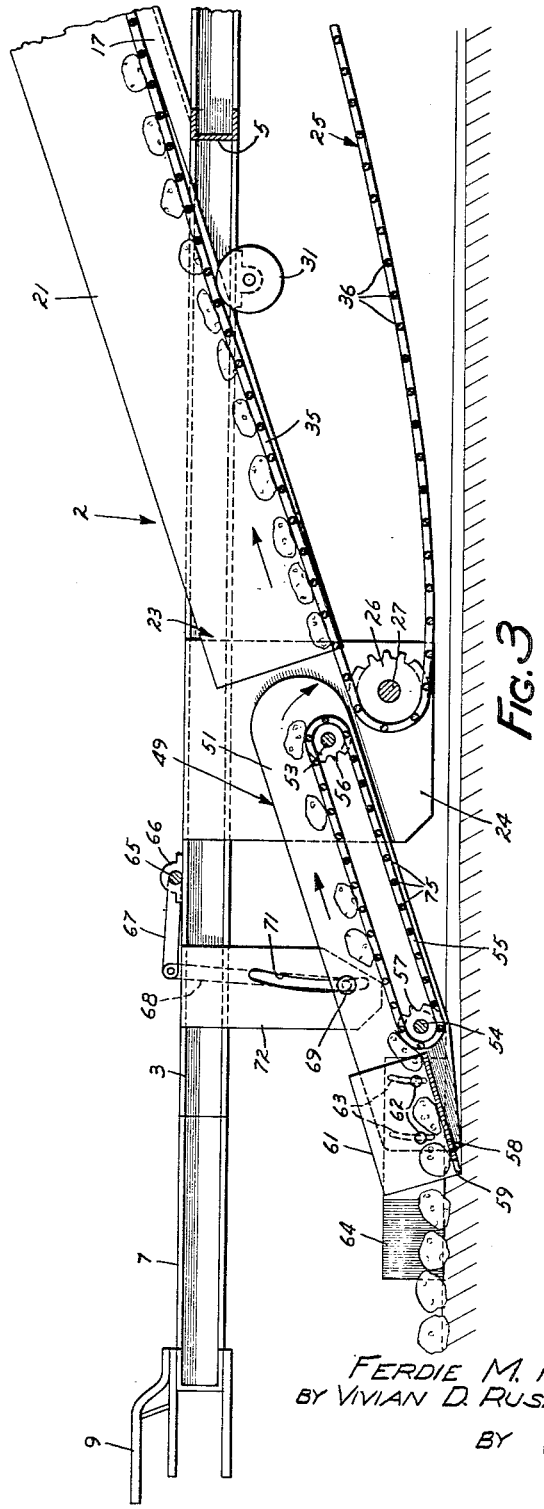
Figure 3 is a longitudinal sectional view on the line 3—3 of Figure 2, on an enlarged scale.

The novel apparatus herein disclosed is shown comprising a main supporting frame, generally designated by the numeral 2, comprising longitudinally extending frame members 3 and 4 secured together in spaced parallel relation by cross members 5 and 6, indicated in Figure 1. The forward end portions 7 and 8 of the side frame members 3 and 4 are preferably bent inwardly and have their terminals secured together by such means as welding, and a suitable coupling member 9 is shown secured thereto to facilitate coupling the machine to a propelling vehicle, such as a tractor.

The rear end portion of the frame is supported upon suitable carrying wheels 11 and 12 mounted on an axle 13 which may be rotatably supported in suitable bearings 14 secured to the side frame members 3 and 4, as indicated in dotted lines in Figure 1. Secured to the side frame members 3 and 4 at their rear ends are a pair of upright posts 15 and 16 having the rear ends of inclined frame members 17 and 18 secured to their upper ends, as will be understood by reference to Figures 1 and 4. A cross member 19 is shown secured to the upright posts 15 and 16 adjacent their upper ends to retain them in spaced parallel relation.

The inclined frame members 17 and 18 extend downwardly from the upper ends of the posts 15 and 16 in a forward direction and may be supported upon and secured to horizontal side frame members 3 and 4. Suitable side boards 21 and 22 are secured to the upright flanges of the side rails 17 and 18, as will be understood by reference to Figure 4, and may have their forward ends extending downwardly between the side frame members 3 and 4, as shown at 23 in Figure 1. The forward ends of the side boards 21 and 22 may be secured to a pair of depending plate elements 24 having their upper marginal edge portions secured to the side rails 3 and 4, as will be understood by reference to Figures 1 and 3.

Main conveyor

A main conveyor, generally designated by the numeral 25 is shown having its forward end supported on sprockets 26 secured to a cross shaft 27. The rear end of the main conveyor is supported on sprockets 28 secured to a similar shaft 29, mounted in suitable bearings, not shown, provided on the main frame, as will be understood by reference to Figures 1 and 4. Interposed between the shafts 27 and 29 are a plurality of idler rollers 31, 32, 33 and 34, which cooperate to support the upper load-carrying run 35 of the main conveyor.

Figure 4:
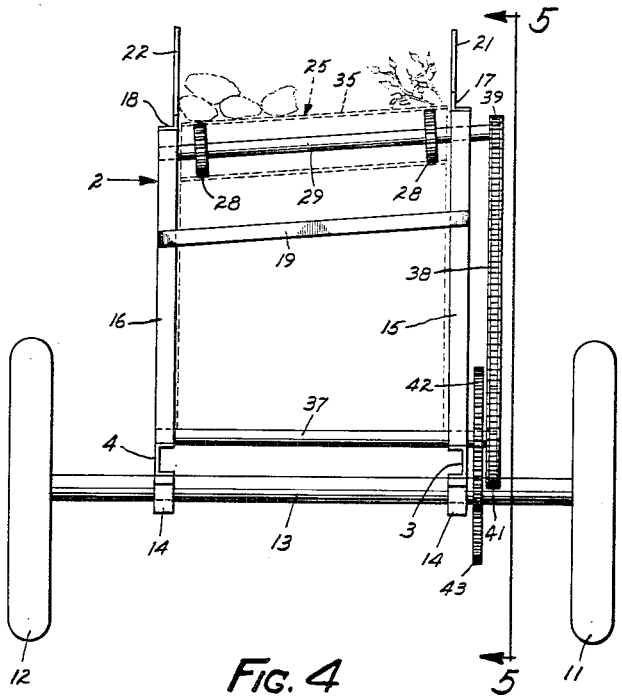
Figure 4 is a cross-sectional view on the line 4—4 of Figure 1, with some of the parts omitted, showing the drive for the main conveyor and also showing the conveyor bed laterally tilted to one side to cause the potatoes to gravitate to one side of the conveyor, thereby to separate them from the vines.

The main conveyor 25 is of conventional construction, and is composed of a plurality of transversely disposed rods 36, spaced apart lengthwise of the conveyor, and having their ends bent and interconnected whereby said rods serve, in effect, as the links of a chain, in that they engage between the teeth of the drive sprockets 28, as will be noted by reference to Figures 2 and 4. The rods 36 also cooperate to provide the bed or carrying surface of the main conveyor.

Drive for main conveyor

Figure 5:
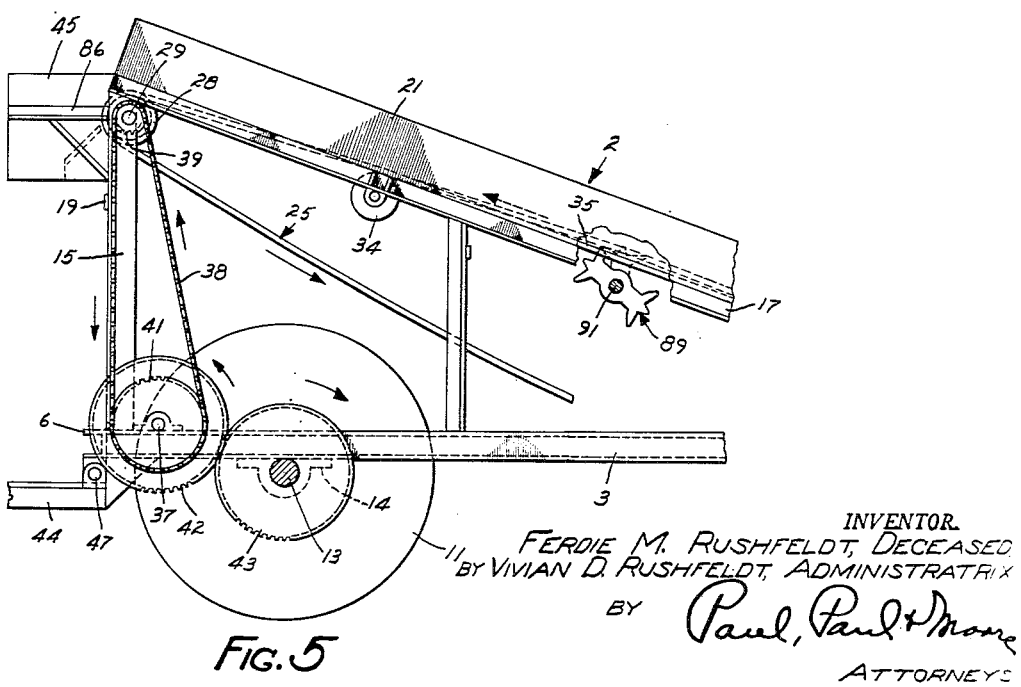
Figure 5 is a detail sectional view on the line 5—5 of Figure 4, showing the means for imparting an agitating action to the conveyor to effect thorough removal of dirt and other foreign matter from the potatoes as they travel upwardly towards the discharge end of the conveyor.

The main conveyor is shown driven from a countershaft 37 by a chain 38 having running connections with sprockets 39 and 41, secured respectively to the conveyor shaft 29 and countershaft 37, as clearly illustrated in Figure 5. Shaft 37 is shown driven from the axle 13 by a pair of back gears 42 and 43 secured, respectively, to the shafts 37 and 13, as shown in Figure 5. When the main conveyor is so driven, the main conveyor will operate when the rear axle 13 is rotated, as a result of traveling movement of the wheels 11 and 12 on the ground. If desired, a suitable clutch, not shown, may be provided for drivingly connecting gear wheel 42 to the jack shaft 37.

A suitable platform 44 is preferably provided at the rear end of the machine, and as shown in Figures 1 and 2, a hopper 45 is provided at the discharge end of the main conveyor 25 for receiving the potatoes therefrom. The bottom of the hopper may be provided with means whereby the walls of an open bag top may be attached thereto, as indicated in Figure 1. The platform 44 is preferably pivotally connected to the rear end of the machine frame, as indicated at 47, whereby it may be swung upwardly to a vertically inoperative position beneath the hopper when not in use, thereby to reduce the overall length of the machine. Chains 46 support the platform when in its lower or operative position.

Potato and vine separating means

Another important feature of the present invention resides in the means provided in the main conveyor for separating the potatoes from the vines, as the potatoes and vines are conveyed rearwardly thereon. To effect such separation of the potatoes from the vines, the upper load-carrying run of the main conveyor belt is shown laterally tilted or inclined from the right hand side of the conveyor to the left-hand side thereof, at an angle which is sufficient to cause the potatoes on the main conveyor to gradually gravitate from the high to the low side thereof, as will be understood by reference to Figure 4, thereby to effect a complete separation of the potatoes from the vines and other debris before the potatoes are discharged from the main conveyor into hopper 45.

A platform 48 may also be provided on the main frame of the machine forwardly of the left rear carrying wheel 12, as shown on Figures 1 and 2, upon which an operator may be stationed for the purpose of manually picking the vines and other refuse from the conveyor and discharging them from the conveyor, and also to remove stones and other foreign articles entrained with the potatoes, and which may be too large to pass between the rods or bars 36 constituting the bed of the main conveyor. See Figure 2.

Pick-up conveyor

Another important feature of the invention resides in the means provided at the forward end of the main conveyor for picking up the potatoes from the surface of the ground and delivering them onto the main conveyor. The means provided for thus picking up the potatoes is best illustrated in Figures 1, 2 and 3, and is shown comprising a relatively short conveyor section, generally designated by the numeral 49. The pick-up conveyor comprises side wall members 51 and 52 shown having their upper ends pivotally supported upon a shaft 53, rotatably mounted in suitable bearings, not shown, provided in the depending plate elements 24.

A similar shaft 54 is mounted in the forward end of the conveyor section 49 and cooperates with shaft 53 to support an endless conveyor chain or belt 55, mounted on sprockets 56 and 57, secured, respectively, to the shafts 53 and 54, as best illustrated in Figure 3. A shovel-like blade 58, having a slightly V-shaped front edge 59, is shown provided with upright end portions 61 which are engageable with the inner sides of the side wall members 51 and 52 and are apertured to receive bolts 62 which pass through elongated apertures or slots 63 provided in the side wall members 51 and 52. Forwardly extending wing-like plates 64 are welded or otherwise secured to the front ends of the side wall members 51 and 52 of the pick-up conveyor, and are slotted similarly to the forward ends of the wall members 51 and 52 to receive the bolts 62, and whereby the position of the pick-up shovel 58 may be relatively adjusted to the conveyor belt 55 and the ground surface.

Adjusting means for pick-up conveyor

Means is provided for vertically adjusting the forward end of the pick-up conveyor 49, and is shown comprising a cross shaft 65 mounted in bearings 66 secured to the side frame members 3 and 4. The shaft 65 is provided at its ends with crank arms 67, having the upper ends of links 68 pivoted thereto, the lower ends of which are pivotally connected to the outer ends of studs 69 secured to the side wall members 51 and 52 of the pick-up conveyor. The studs 69 traverse arcuately formed slots 71 provided in a pair of depending guide plates 72 which cooperate with the plate elements 24 to guide the pick-up conveyor 49 in its up-and-down movements, relative to the main frame of the machine.

A suitable operating lever 73 is secured to the cross shaft 65, and preferably extends forwardly, as shown in Figure 1, whereby an operator on the tractor or propelling vehicle may readily grasp the lever and raise or lower the front end of the pick-up conveyor, as will readily be understood by reference to Figures 1 and 3. Suitable means such as a bolt and quadrant indicated at 74 in Figure 1, may be provided for locking the shaft 65 in adjusted position.

When the apparatus is not in use, the front end of the pick-up conveyor 49 may be swung upwardly out of engagement with the ground, as indicated in dotted lines in Figure 1. The conveyor belt 55 of the pick-up conveyor is preferably composed of spaced parallel rods 75, similar to the rods 36 of the main conveyor 25, whereby small particles delivered onto the conveyor may drop therethrough onto the ground, and whereby only clean potatoes are delivered onto the main conveyor, as shown in Figure 3.

Figures 6, 7, 8:
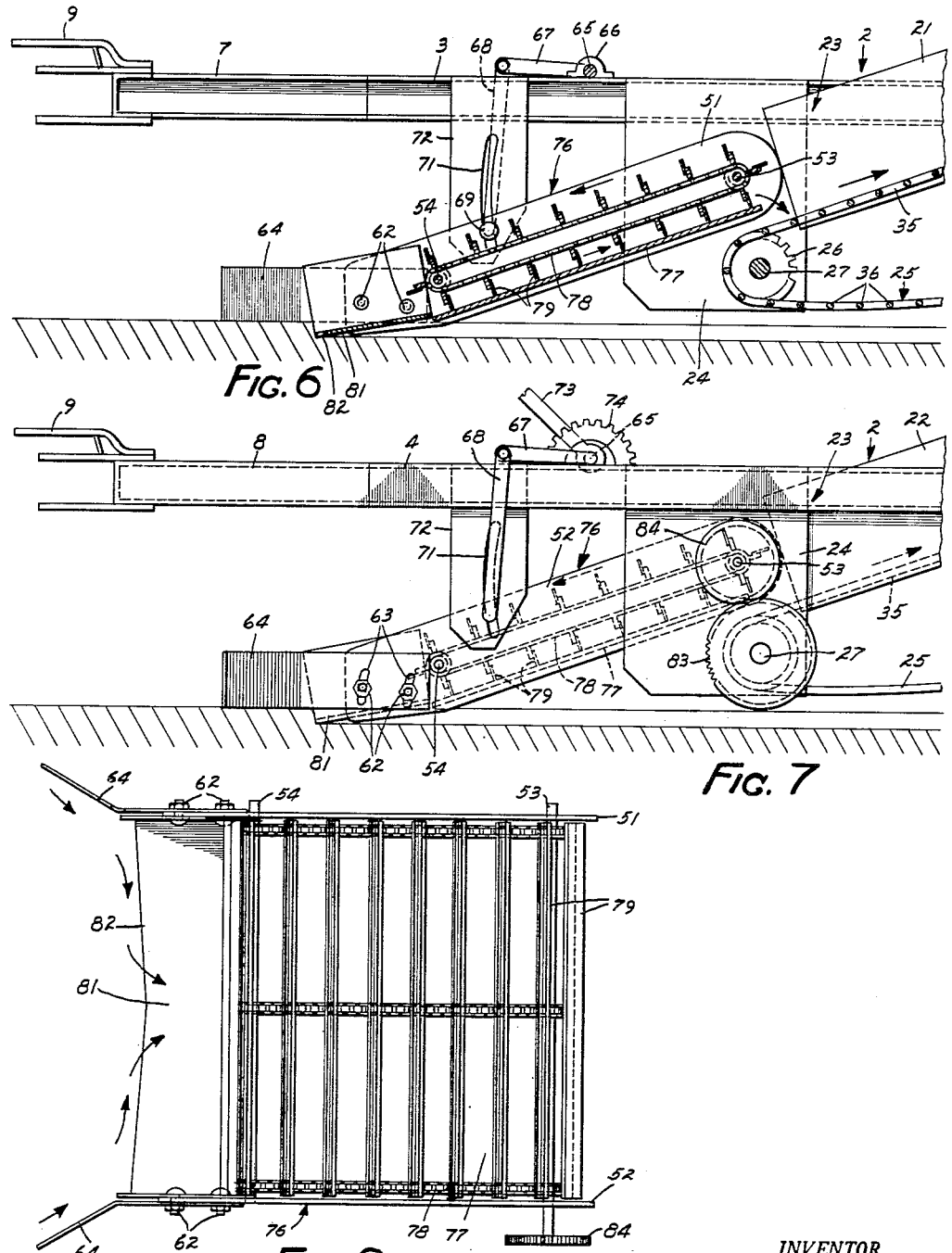

In Figures 6, 7 and 8, there is shown a machine comprising a pick-up conveyor 76 having side walls 51 and 52 similar to the side walls of the pick-up conveyor 49, shown in Figure 3. Pick-up conveyor 76, however, differs from conveyor 49 in that it has a bottom wall 77, and the conveyor chain or belt 78 thereof is provided with transversely disposed flights 79, preferably of a flexible material such as rubber, the edges of which may substantially engage the bottom wall 77 of the conveyor. Conveyor belt 78 is supported on shafts 53 and 54 in a manner similar to the conveyor belt of pick-up conveyor 49, shown in Figure 3, and the upper shaft 53 may provide the pivotal support for pick-up conveyor 76 upon the depending plate elements 24 of the machine frame.

A blade-like shovel 81 similar to shovel 58 shown in Figure 3, is adjustably secured to the forward ends of the side wall members 51 and 52 in a manner similar to the shovel 58 of pick-up conveyor 49. In the form shown in Figure 6, the rear end or edge of shovel 81 is positioned substantially in alignment with the front end of the bottom wall 77 or at a position slightly thereabove, as shown in Figure 6. The front edge of the shovel is positioned to dig into the surface of the ground to a depth sufficient to pick up the product to be harvested, such as onions, beets, carrots, and other garden vegetables. The wings 64 inwardly direct the vegetables to the shovel 81, and the V-shaped edge 82 thereof tends to further direct the vegetables inwardly towards the center of the conveyor, as indicated by the arrows in Figure 8. The vegetables then slide backwardly on the shovel 81 onto the bottom wall 77 of the conveyor where they are engaged by the flights 79 of the conveyor chain and conveyed upwardly and delivered onto the receiving end of the main conveyor 25. Conveyor belt 78 of pick-up conveyor 76 may be driven from the front shaft 27 of the main conveyor by suitable gears 83 and 84, secured respectively to shafts 27 and 53, as shown in Figure 7.

Operation

In the operation of the novel potato picker herein disclosed, the pick-up conveyor section 49 is adjusted by manipulation of the lever 73 to cause the front edge 59 of the blade 58 thereof to slightly penetrate into the surface of the soil, so that when the machine moves forwardly, the blade will enter beneath the potatoes or other vegetables and upwardly direct them onto the upper run of the belt 55 of the pick-up conveyor, as shown in Figure 3.

If the potato vines have not been previously removed from the potatoes, they may be picked with the potatoes by pick-up conveyor section 49 and dumped onto the receiving end of the main conveyor, which then conveys them rearwardly with the potatoes into engagement with deflector 85, shown having one end secured to the side wall member 22 of the main conveyor. The other end of the deflector 85 extends outwardly over the main conveyor with its free end spaced from the opposite side wall of the conveyor, as clearly illustrated in Figure 2. When the potatoes and potato vines engage deflector 85, they are directed to the high side of the conveyor from whence the clean potatoes will roll by gravity to the low side of the conveyor, as indicated in Figure 2, while the potato vines will continue rearwardly on the conveyor on the high side thereof. It will thus be seen that by slightly transversely tilting the main conveyor, as illustrated in Figure 4, the potatoes are separated from the vines and other lighter refuse on the conveyor, and are discharged from the tail end of the conveyor into hopper 45, there to be sacked, or otherwise disposed of, as will be understood by reference to Figure 1. The potato vines and other debris carried upwardly on the high side of the conveyor may be allowed to discharge from the tail end of the conveyor onto the ground. An inclined plate or table 86 may be provided at the rear end of the machine for directing the potato vines and other debris from the machine onto the ground.

If desired, an operator stationed on platform 48 may conveniently pick out stones and other debris entrained with the potatoes, which may be too large to pass through the spaces between the rods 36 of the main conveyor 25. The operator on platform 48 may also manually remove the potato vines from the conveyor and throw them onto the ground on the right hand side of the machine. If not, the vines are discharged from the tail end of the machine, as hereinbefore stated, and as indicated by the arrow 87 in Figure 2.

It is to be understood that the potatoes or other vegetables to be picked up have previously been dug so that they are usually disposed in rows along the field, whereby they may readily be picked up by the shovel-like blade 58 of the machine and delivered onto the main conveyor, as hereinbefore described.

In Figures 1, 2 and 4, the main conveyor is shown driven from the rear axle of the machine through the gears 42 and 43. The pivoted pick-up section 49 is shown driven from the cross shaft 27 by a suitable chain drive 88, shown in Figure 1. When the machine is to be used for picking up small garden vegetables such as onions, beets, carrots, and the like, the pivoted conveyor section 76, shown in Figure 6, is substituted for pick-up conveyor section 49, shown in Figure 3. The operation of the apparatus otherwise, is identical to that of the machine shown in Figure 3.

If the spacing between the cross bars 36 of the main conveyor is too great for the product to be conveyed, it may be necessary to substitute a conveyor belt having smaller openings between its bars 36 for the main conveyor belt shown in Figure 3, so that the vegetables carried upwardly by the conveyor will not pass therethrough. As the vegetables are conveyed upwardly on the main conveyor, the upper run of the belt may be constantly agitated to cause any dirt or other foreign matter being conveyed upwardly with the potatoes to be loosened therefrom so that it may drop through the conveyor onto the ground before reaching the hopper 45 at the rear end of the machine.

To thus agitate the conveyor belt, an agitator 89 may be mounted beneath the upper run of the conveyor belt 25 adapted to engage the cross rods 36 thereof and impart to the conveyor a vibratory or agitating action, as indicated by the full and dotted lines in Figure 5. The agitating elements 89 may be supported upon a shaft 91, and are actuated by the cross rods 36 of the conveyor bed, as will be understood by reference to Figure 5.

The novel apparatus herein disclosed has been found extremely practical and efficient in actual operation. It presents the utmost in simplicity and is comparatively light in weight and is readily adaptable for use in the harvesting of most garden vegetables, particularly potatoes.

The foregoing detailed description has been given for clearness of understanding only, and no unnecessary limitations should be understood therefrom, but the appended claim should be construed as broadly as permissible in view of the prior art.

What is claimed is:

In an apparatus of the class described, a mobile frame including longitudinally extending oppositely disposed horizontal side frame members, a pair of plate members secured to the forward ends of said frame members and depending therefrom with their lower edges disposed in close proximity to the ground, a shaft rotatably mounted in the lower rear portions of said plate members and having a plurality of sprockets mounted thereon, an open endless belt having a running connection with said sprockets and constituting the forward end of a main conveyor, said frame members extending forwardly beyond said plate members and having means thereon for coupling said frame to a power vehicle, a potato pick-up conveyor mounted forwardly of the main conveyor and comprising a transverse shaft having its end portions rotatably supported in said plate members above said main conveyor shaft, a rock shaft mounted on said side frame members and having a pair of crank arms secured thereto, said pick-up conveyor comprising longitudinally extending side walls, links connecting the forward end portions of said side walls to said crank arms, means for manually rocking said shaft to actuate said crank arms to vertically adjust the forward end of the pick-up conveyor with respect to the ground surface, a transversely disposed shaft rotatably mounted in the forward end portions of the side walls of the pick-up conveyor and cooperating with the shaft at the rear end thereof to support an open endless conveyor belt, a transversely disposed ground-engaging blade forwardly of the pick-up conveyor, the front edge of said ground-engaging blade being V-shaped to provide opposed inwardly and rearwardly directed ground-engaging edges which cooperate to inwardly direct potatoes to the center of the pick-up conveyor, said ground-engaging blade having upturned end portions seated against and adjustably secured to the forward ends of the side walls of the pick-up conveyor, whereby the V-shaped ground-engaging edge of said blade may be vertically adjusted with respect to the ground surface and with respect to the median plane of the pick-up conveyor, and forwardly and outwardly extending guide members secured to the forward ends of the side walls of the pick-up conveyor for directing loose potatoes into the path of the pick-up conveyor, thereby to facilitate gathering potatoes from the surface of the ground and delivering them to the main conveyor.

References Cited in the file of this patent

UNITED STATES PATENTS

| Number | Name | Date |
|---|---|---|
| 563,238 | Prinz | June 30, 1896 |
| 2,015,549 | Dwyer et al. | Sept. 24, 1935 |
| 2,287,367 | Albin | June 23, 1942 |
| 2,468,639 | Sample | Apr. 26, 1949 |
| 2,559,965 | Innes | July 10, 1951 |
| 2,578,189 | Johnston | Dec. 11, 1951 |